United States Patent
Yao

(10) Patent No.: US 11,082,736 B2
(45) Date of Patent: Aug. 3, 2021

(54) TARGETED CONTENT DELIVERY FOR IN-VEHICLE OVER-THE-AIR TELEVISION BROADCASTS

(71) Applicant: DISH Wireless L.L.C., Englewood, CO (US)

(72) Inventor: Kevin Yao, Cheyenne, WY (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 16/673,675

(22) Filed: Nov. 4, 2019

(65) Prior Publication Data
US 2021/0136439 A1 May 6, 2021

(51) Int. Cl.
*H04N 21/414* (2011.01)
*H04N 21/4363* (2011.01)
*H04N 21/442* (2011.01)
*H04N 21/434* (2011.01)
*H04N 21/45* (2011.01)

(52) U.S. Cl.
CPC . *H04N 21/41422* (2013.01); *H04N 21/41407* (2013.01); *H04N 21/4343* (2013.01); *H04N 21/43637* (2013.01); *H04N 21/44227* (2013.01); *H04N 21/4532* (2013.01)

(58) Field of Classification Search
CPC ....... H04N 21/41422; H04N 21/41407; H04N 21/4343; H04N 21/43637; H04N 21/44227; H04N 21/4532; H04N 21/2146; H04N 21/414; H04N 21/4104; H04N 21/214
See application file for complete search history.

(56) References Cited

U.S. PATENT DOCUMENTS

| | | | |
|---|---|---|---|
| 10,667,008 B1 * | 5/2020 | Cansino | ............... H04N 21/251 |
| 2001/0039663 A1 | 11/2001 | Sibley | |
| 2004/0049797 A1 * | 3/2004 | Salmonsen | ............. G06F 13/40 725/132 |
| 2008/0032685 A1 | 2/2008 | Talty et al. | |
| 2008/0120681 A1 * | 5/2008 | Sibley | .............. H04N 21/41407 725/136 |

(Continued)

FOREIGN PATENT DOCUMENTS

| | | |
|---|---|---|
| WO | 2004/064300 A2 | 7/2004 |
| WO | 2015/070140 A1 | 5/2015 |

OTHER PUBLICATIONS

International Search Report and Written Opinion for PCT/US2020/057948 dated Feb. 8, 2021, all pages.

*Primary Examiner* — Alexander Gee
(74) *Attorney, Agent, or Firm* — Kilpatrick Townsend & Stockton LLP

(57) ABSTRACT

Various arrangements for performing in-vehicle delivery of over-the-air (OTA) television channel broadcasts are presented. A vehicle antenna can be installed on a vehicle. An OTA television tuner that receives an OTA television channel broadcast and is electrically connected with the vehicle antenna may be present. A wireless network hotspot module can be installed in the vehicle and can receive the OTA television channel broadcast from the OTA television tuner. The OTA television channel may be packetized. The packetized OTA television channel can be broadcast via a wireless local area network (WLAN) to a mobile device located within the vehicle for presentation.

12 Claims, 6 Drawing Sheets

(56) References Cited

U.S. PATENT DOCUMENTS

| | | | | |
|---|---|---|---|---|
| 2008/0268838 A1* | 10/2008 | Zufall | .................. | H04B 7/0408 |
| | | | | 455/430 |
| 2009/0275285 A1* | 11/2009 | Maricevic | ........... | H04W 56/001 |
| | | | | 455/41.3 |
| 2010/0142723 A1* | 6/2010 | Bucklen | .................... | H04R 3/02 |
| | | | | 381/81 |
| 2010/0325666 A1* | 12/2010 | Wiser | ................. | H04N 21/6338 |
| | | | | 725/44 |
| 2011/0055874 A1* | 3/2011 | Libin | ................ | H04N 21/4351 |
| | | | | 725/62 |
| 2012/0054024 A1* | 3/2012 | Polizzotto | ............. | G06Q 30/02 |
| | | | | 705/14.46 |
| 2012/0311642 A1* | 12/2012 | Ginn | ................. | H04N 21/8106 |
| | | | | 725/62 |
| 2017/0279549 A1* | 9/2017 | Kocheisen | ............. | H04H 20/57 |
| 2018/0139508 A1 | 5/2018 | Norin et al. | | |

\* cited by examiner

US 11,082,736 B2

TARGETED CONTENT DELIVERY FOR IN-VEHICLE OVER-THE-AIR TELEVISION BROADCASTS

BACKGROUND

In many geographic areas, television channels, such as network affiliates and independent television channels, broadcast over-the-air (OTA) television channels. These television channels broadcast in the VHF and UHF frequency bands. These OTA television channels can be received using an analog or digital OTA antenna. While using such an antenna to receive OTA television channel broadcasts is not a significant issue at certain locations, such as a viewer's residence, such an antenna may be impractical when the viewer is away from his home.

SUMMARY

Various embodiments are described related to a system for in-vehicle delivery of over-the-air (OTA) television channel broadcasts. In some embodiments, a system for in-vehicle delivery of over-the-air (OTA) television channel broadcasts is described. The system may comprise a vehicle antenna that may be installed on a vehicle. The system may comprise an OTA television tuner that may receive an OTA television channel broadcast and may be electrically connected with the vehicle antenna. The system may comprise an OTA television-enabled wireless network hotspot module that may be installed in the vehicle and may receive the OTA television channel broadcast from the OTA television tuner. The OTA television-enabled wireless network hotspot module may be configured to packetize the OTA television channel broadcast. The OTA television-enabled wireless network hotspot module may be configured to transmit the packetized OTA television channel broadcast via a wireless local area network (WLAN) to a mobile device located within the vehicle.

Embodiments of such a system may include one or more of the following features: the system may further comprise a content storage non-transitory processor-readable medium that may store a plurality of pieces of content received by the OTA television-enabled wireless network hotspot module. The OTA television-enabled wireless network hotspot module may be configured to detect a designated location within the OTA television channel broadcast and may insert a piece of stored content from the plurality of pieces of stored content stored by the content storage non-transitory processor-readable medium such that the inserted piece of stored content may be transmitted as part of the packetized OTA television channel broadcast via the WLAN to the mobile device located within the vehicle. The OTA television-enabled wireless network hotspot module may be further configured to obtain a mobile device profile from the mobile device. The OTA television-enabled wireless network hotspot module may be configured to select the piece of stored content from a plurality of pieces of stored content instances based at least in part on the mobile device profile obtained from the mobile device. The OTA television-enabled wireless network hotspot module may be configured to analyze metadata received as part of the OTA television channel broadcast and the piece of stored content may be selected from the plurality of pieces of stored content instances based at least in part on the metadata. The system may further comprise a cellular interface that communicates with the OTA television-enabled wireless network hotspot module and that may transmit data received from the OTA television-enabled wireless network hotspot module to a remote server system. The transmitted data may comprise usage feedback about the plurality of pieces of stored content being inserted into OTA television channel broadcasts. The system may further comprise a smartphone. The smartphone may function as the mobile device and the smartphone may transmit usage feedback about the plurality of pieces of stored content being inserted into OTA television channel broadcasts via a cellular network with which the smartphone may directly communicate. The vehicle antenna additionally may function as a frequency modulation (FM) radio antenna for radio stations broadcast using the VHF (Very High Frequency) frequency band.

In some embodiments, a method for in-vehicle delivery of over-the-air (OTA) television channel broadcasts is described. The method may comprise connecting, by an OTA television-enabled wireless network hotspot module, a mobile device located within a vehicle with a wireless local area network (WLAN) created by the OTA television-enabled wireless network hotspot module. The OTA television-enabled wireless network hotspot module may be installed within the vehicle. The method may comprise receiving, by the OTA television-enabled wireless network hotspot module from the mobile device, a request to stream an OTA television channel broadcast. The method may comprise receiving, by the OTA television-enabled wireless network hotspot module, via an OTA television tuner and an in-vehicle antenna, the OTA television channel broadcast. The method may comprise packetizing, by the OTA television-enabled wireless network hotspot module, the OTA television channel broadcast to a format appropriate to transmit via the wireless local area network to the mobile device. The method may comprise transmitting, by the OTA television-enabled wireless network hotspot module, the packetized OTA television channel broadcast via the WLAN to the mobile device located within the vehicle.

Embodiments of such a method may include one or more of the following features: the method may comprise receiving, by the OTA television-enabled wireless network hotspot module, a plurality of pieces of content to be inserted during OTA television channel broadcasts. The method may comprise storing, by the OTA television-enabled wireless network hotspot module, the pieces of content to be inserted during the OTA television channel broadcasts to a content storage non-transitory processor-readable medium. The method may further comprise detecting, by the OTA television-enabled wireless network hotspot module, a designated location within the OTA television channel broadcast. The method may further comprise inserting, by the OTA television-enabled wireless network hotspot module, a piece of stored content from the plurality of pieces of content such that the inserted piece of stored content may be transmitted as part of the packetized OTA television channel broadcast via the WLAN to the mobile device located within the vehicle. The method may further comprise obtaining, by the OTA television-enabled wireless network hotspot module, a mobile device profile from the mobile device. The method may further comprise storing, by the OTA television-enabled wireless network hotspot module, the mobile device profile. The method may further comprise selecting, by the OTA television-enabled wireless network hotspot module, the piece of stored content from the plurality of pieces of stored content based at least in part on the mobile device profile obtained from the mobile device. The method may further comprise analyzing, by the in-vehicle wireless network hotspot, metadata received as part of the OTA television channel broadcast. The piece of stored content may be selected from the plurality of pieces of stored content based at least in part on the metadata. The method may further comprise transmitting, by the OTA television-enabled wireless network hotspot module, via a cellular interface, feedback data to a remote server system. The transmitted feedback data may comprise usage feedback about the plurality of stored pieces of content being inserted into OTA television channel broadcasts. The vehicle antenna additionally may function as a frequency modulation (FM) radio antenna for radio stations broadcast using the VHF (Very High Frequency) frequency band. The method may further comprise presenting, by the mobile device, video of the packetized OTA television channel broadcast for viewing by a user.

DETAILED DESCRIPTION OF THE INVENTION

When a mobile device is present in a vehicle, vehicle systems and components can be leveraged to allow the mobile device to receive and output for presentation over-the-air (OTA) television channel broadcasts. Almost all vehicles are equipped with an antenna to receive FM (frequency modulation) radio broadcasts. FM radio broadcasts are typically performed as part of the VHF (Very High Frequency) band. FM radio broadcasts, at least in North America, may be performed between 88 MHz and 108 MHz. Nearby portions of the VHF band, such as between 54 MHz and 88 MHz and between 174 MHz and 216 MHz may be designated for OTA television channel broadcasts. Therefore, an antenna that is tuned to receive FM radio broadcasts may be able to relatively effectively receive OTA television channel broadcasts since the frequencies are similar.

Antennas that can effectively receive VHF broadcasts from a relatively distant broadcast tower may tend to be large enough that they are impractical to directly incorporate as part of a mobile device, such as a smartphone, gaming device, tablet computer, or laptop. However, almost every vehicle is large enough that incorporation of a VHF antenna is relatively inconsequential to the design of the vehicle and is already present for use with the vehicle's radio. Such a radio antenna or an antenna specifically designed for OTA television broadcast reception (e.g., for both the VHF and UHF bands) may be incorporated into a vehicle. Such an antenna can be leveraged to receive OTA television channel broadcasts, such as those transmitted according to the Advanced Television Systems Committee (ATSC) 3.0 standard.

A system installed within the vehicle may be configured to receive digital OTA television channel broadcasts. The system may further be designed to perform dynamic content insertion within digital OTA television channel broadcasts. Such dynamic content insertion can allow the local system to insert stored content that replaces content received as part of the OTA television channel broadcast. A non-transitory processor-readable medium may be used to store content locally at the vehicle. Based on metadata present within a received OTA television channel broadcast, rather than presenting a piece of content present within the OTA television channel broadcast, a piece of content stored locally at the vehicle may be inserted into the stream of the broadcast being transmitted to a mobile device within the vehicle via a wireless network, such as a Wi-Fi network. The piece of content inserted into the stream of the OTA television channel broadcast can be selected based on a profile of the wireless device, the geographic location of the vehicle, metadata received as part of the OTA television channel broadcast, and/or stored user profile information.

Figure 1:
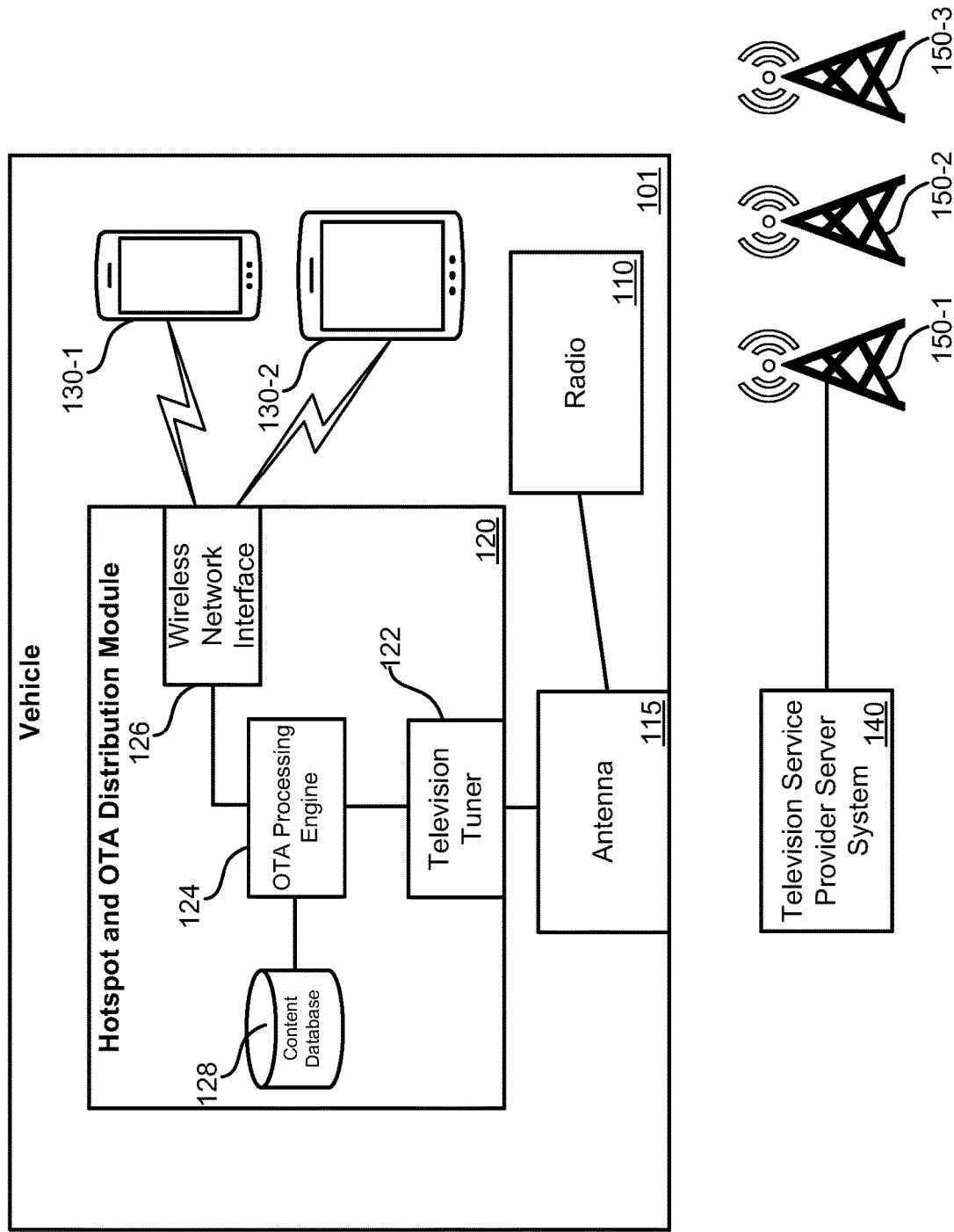
FIG. 1 illustrates an embodiment of an in-vehicle OTA television broadcast delivery system.

Further detail about these and other embodiments are provided in relation to the figures. FIG. 1 illustrates an embodiment of an in-vehicle OTA television broadcast delivery system 100, referred to as "system 100" herein. System 100 can include: vehicle 101; radio 110; antenna 115; hotspot and OTA distribution module 120 ("HODM 120," as referred to as OTA television-enabled wireless network hotspot module 120), television tuner 122; OTA processing engine 124; wireless network interface 126; content database 128; mobile devices 130 (e.g., 130-1, 130-2); television service provider server system 140; and OTA television channel broadcasting equipment installations 150 (e.g., 150-1, 150-2, and 150-3).

Vehicle 101 can represent various types of vehicles, including cars, trucks, SUVs, tractor-trailers (i.e., semis), golf carts, ATVs, vans, RVs, trailers, motorcycles, or various other forms of passenger, commercial, or recreational vehicles. Vehicle 101 can have various components incorporated. Radio 110 may be incorporated as part of vehicle 101 to allow a passenger to listen to AM and/or FM radio stations. Antenna 115 may be used to receive FM and/or AM radio stations. In some embodiments, antenna 115 may be used for dual-purposes. In addition to receiving FM and/or AM radio stations, antenna 115 can be used to receive OTA television channel broadcasts that are transmitted by OTA television channel broadcasting equipment installations 150. Each instance of OTA television channel broadcasting equipment installations 150 may transmit one or more OTA television channels on different frequencies which are reserved for OTA television broadcasts.

In some embodiments, rather than antenna 115 being used by both radio 110 and HODM 120, HODM 120 may be connected with one or more dedicated antennas for received OTA television channel broadcasts. For example, a dedicated antenna may be used for receiving OTA television channel broadcasts transmitted on the VHF band and a second dedicated antenna may be used for receiving OTA television channel broadcasts transmitted on the UHF band.

Antenna 115 can be electrically connected with television tuner 122. In the illustrated embodiment of system 100, a single television tuner is present. In other embodiments, multiple television tuners may be present to allow HODM 120 to receive multiple television channels simultaneously. For instance, passengers may desire to view different OTA television channels and/or one or more OTA television channel broadcasts may be recorded to content database 129.

OTA processing engine 124 may include one or more processors. OTA processing engine 124 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD).

OTA processing engine 124 may control to which OTA television channel broadcast (if any) television tuner 122 is tuned. OTA processing engine 124 may also route received OTA television channel broadcasts as appropriate to wireless network interface 126 for transmission to one or more mobile devices 130 and/or to content database 128 for storage. OTA processing engine 124 may process channel-change requests received from mobile devices 130 and transmit an instruction to television tuner 122 to tune to the requested television channel.

In some embodiments, OTA processing engine 124 tunes television tuner 122 to obtain specific pieces of content from an OTA television channel broadcast for storage to content database 128. This content may be mapped to metadata that is received as part of the OTA television channel broadcast. This content may be used for dynamic insertion into OTA television channel broadcasts that are being streamed to one or more mobile devices 130 or can be dynamically inserted into a previously-recorded OTA television channel broadcast that is being streamed to one or more mobile devices 130. For instance, advertising content may be received from an OTA television channel broadcast that is dedicated to transmitting advertising content to be captured and stored for insertion. Such content may be recorded and inserted into an OTA television channel broadcast stream over an advertisement present in a commercial break in the OTA television channel broadcast stream.

Additionally or alternatively to content being received for dynamic insertion via a dedicated OTA television channel broadcast stream, metadata included within a piece of content received from any OTA television channel broadcast may be captured and may indicate that the content is to be recorded and output in particular circumstances. For instance, a broadcast piece of content (e.g., an advertisement) may be associated with metadata indicating that: 1) the piece of content is to be recorded and stored for 30 days; and 2) the piece of content is to be output as a dynamically inserted piece of content in an OTA television channel broadcast; 3) the piece of content is to be output in a location within the OTA television channel broadcast that is of a duration that matches the duration of the piece of content; and/or 4) the piece of content is to be dynamically inserted as part of the same OTA television channel on which the piece of content was originally received.

Content database 128 may be stored using one or more non-transitory processor readable mediums. Content database 128 may be used to store content that was recorded based on a timer defined by a user of one of mobile devices 130. A user may define a timer that records a particular OTA television channel broadcast for a particular time period. Content database 128 may additionally or alternatively be used to store content that will has been recorded for dynamic insertion within an OTA television channel broadcast. For example, an advertisement recorded from an OTA television channel broadcast may be inserted during a later commercial break on the same OTA television channel broadcast such that a viewer of the OTA television channel broadcast views the recorded advertisement rather than the advertisement transmitted as part of the later commercial break on the OTA television channel broadcast.

Wireless network interface 126 may perform multiple functions. First, wireless network interface 126 may function as a hotspot that allows one or more wireless devices to wirelessly connect with wireless network interface 126. Wireless network interface 126 may create a Wi-Fi wireless local area network (WLAN) that can be joined by one or more wireless devices. Other forms of WLANs may be used other than those based on IEEE 802.11 standard. Wireless network interface 126 may also function to packetize, transcode, and transmit OTA television channel broadcasts to one or more wireless devices via the WLAN created by wireless network interface 126. Therefore, wireless network interface 126 converts the OTA television channel broadcast to a format that is appropriate to transmit via a packet-based wireless network. Wireless network interface 126 may be bidirectional such that commands from wireless devices may be passed to OTA processing engine 124. A third function of wireless network interface 126 may be to connect with another wireless network, when available. For instance, when vehicle 101 is parked at an owner's home or in a location where public Wi-Fi is available, wireless network interface 126 may be able to access the Internet. When such an Internet connection is possible, content to be stored to content database 128 for dynamic content insertion may be requested and received via the Internet connection.

The wireless devices with which wireless network interface 126 communicates may be located within vehicle 101 such as mobile devices 130 or nearby vehicle 101. For example, when vehicle 101 is not in motion (e.g., parked), users present in nearby vehicle 101 may be permitted to connect with the wireless network formed by wireless network interface 126. Mobile devices 130 represent examples of computerized devices that can receive and output video and/or audio. For example, mobile devices 130 can include smartphone 130-1 and tablet computer 130-2. The number of mobile devices that are in wireless communication with wireless network interface 126 can vary from zero up to potentially dozens. Other forms of mobile devices 130 can include laptop computers, gaming devices or any other form of mobile computerized device that can be present within vehicle 101 and communicate wirelessly with wireless network interface 126. In some embodiments, a vehicle may have one or more built-in entertainment systems that include video screens. Such built-in entertainment systems may communicate with wireless network interface 126 or may have a wired connection with HODM 120.

In system 100, wireless network components and OTA television broadcast receiving components are incorporated as part of HODM 120. In other embodiments, these components may not be part of an HODM 120, but rather may be separate modules that communicate with each other. For instance, television tuner 122, OTA processing engine 124, content database 128, and any other OTA television focused component may be incorporated as part of an OTA distribution system. Vehicle 101 may have a separate WLAN system. Such an arrangement may be preferable if OTA television capabilities are being added to vehicle 101 and vehicle 101 already has an installed WLAN system.

Some or all of OTA television channel broadcasting equipment installations 150 may transmit OTA television channel broadcasts using the ATSC 3.0 standard. Among other features, such a standard (or some other standard) may allow metadata to be included as part of an OTA television channel broadcast. For a particular piece of content, metadata may be included that indicates: 1) the duration of the piece of content; 2) whether the piece of content is to be recorded and dynamically inserted; 3) user characteristics to be present to trigger dynamic insertion. The user characteristics may refer to: the geographic location of vehicle 101, and/or user profile data stored by HODM 120. A television service provider server system 140 may transmit the content and metadata to be transmitted to an associated OTA television channel broadcasting equipment installation, such as OTA television channel broadcasting equipment installation 150-1.

Figure 2:
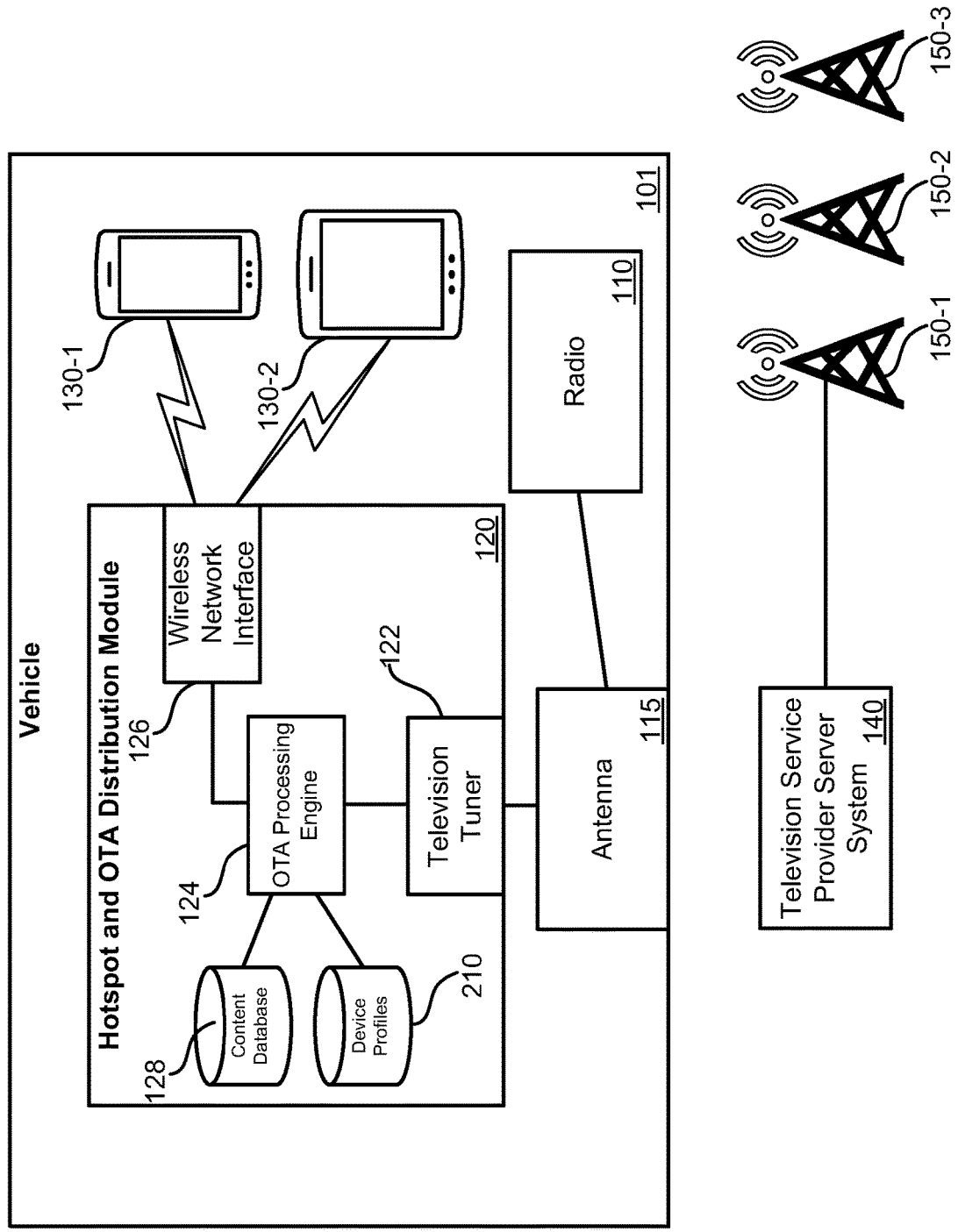
FIG. 2 illustrates an embodiment of an in-vehicle OTA television broadcast delivery system that performs dynamic content insertion.

FIG. 2 illustrates an embodiment of an in-vehicle OTA television broadcast delivery system 200 ("system 200") that performs dynamic content insertion. System 200 may function similarly to system 100 of FIG. 1. However, in addition to the previously-detailed functionality of system 100, HODM 120 can include device profiles 210. Device profiles 210 may be stored using a non-transitory processor readable medium, such as the same one or more non-transitory processor readable mediums that are used to store content database 128.

In some embodiments, data may be stored in the cloud. For instance, content database 128 and devices profiles 210 may be stored by a cloud-based server system of a service provider's system. Communication between the cloud-based server system and hotspot and HODM 120 may be performed based on a unique identifier that allows HODM 120 to be identified. Alternatively, a redundant setup may be present that involves the same data being stored locally by HODM 120 and by a cloud-based server system.

A device profile may be created when a mobile device such as smartphone 130-1 or tablet computer 130-2 connects with the WLAN created by wireless network interface 126. A device profile stored as part of device profiles 210 by OTA processing engine 124 may indicate the type of mobile device, make/model of the mobile device, and/or features of the mobile device. As the mobile device is used to access television programming via HODM 120, usage statistics may be compiled about the device, such as the television channels and types of content that the user of the mobile device prefers. Such data can be used for targeting content for dynamic insertion. For example, if a mobile device tends to be used to watch a particular OTA television channel broadcast that is dedicated to children's programming, the device profile for the device stored in device profiles 210 may indicate such a preference. Content inserted into an OTA television channel broadcast by OTA processing engine 124 from content database 128 may be focused on children.

Device profiles may be maintained across sessions. Therefore, if a mobile device of mobile devices 130 repeatedly connects with wireless network interface 126, a single device profile may be built and modified over time. Over time, the device profile may more accurately represent characteristics of the mobile device and the user. In some embodiments, if wireless network interface 126 can be used to access the Internet, the particular web sites or services that wireless network interface 126 is used to access may be used to build the device profile associated with the wireless device.

Figure 3:
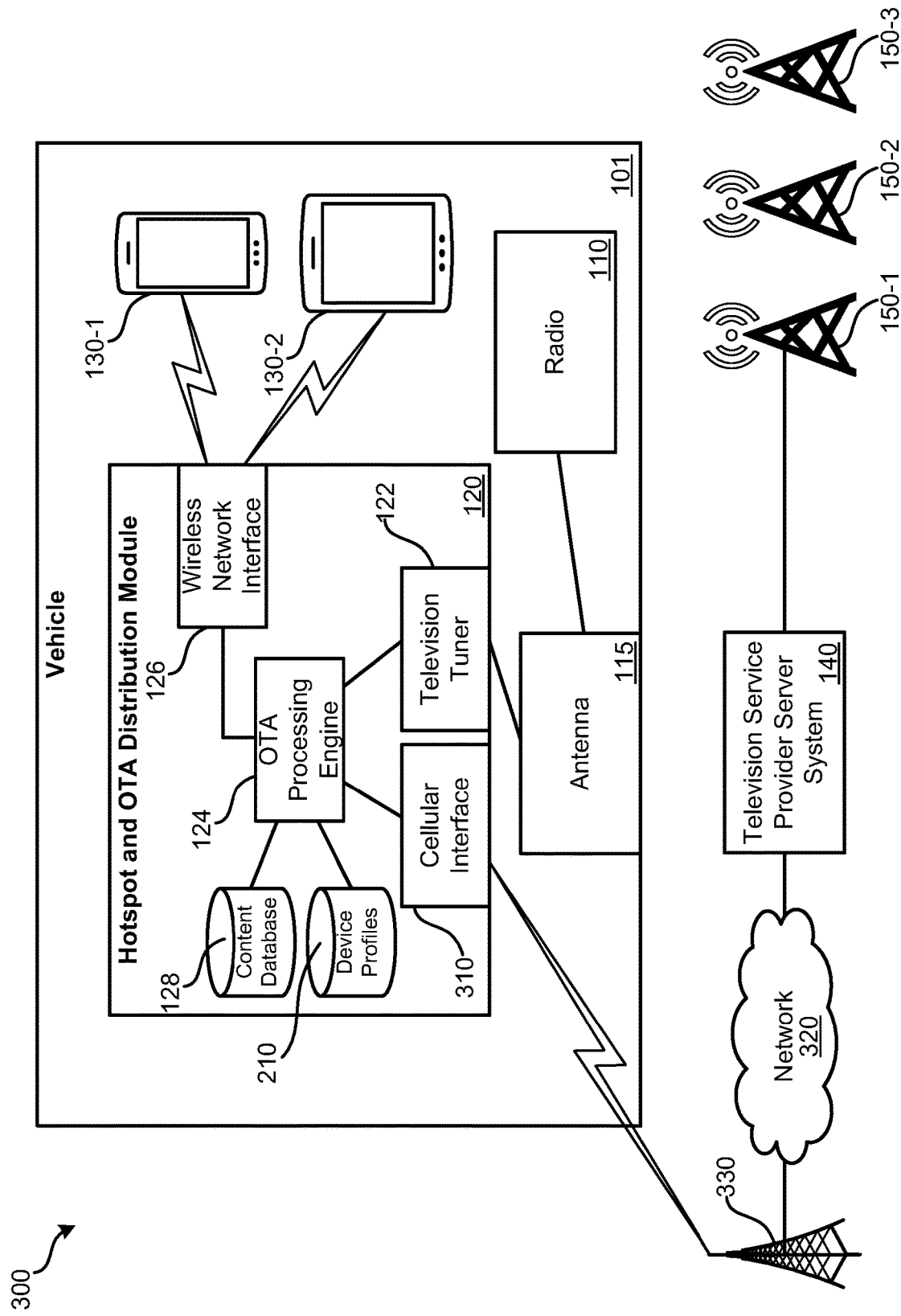
FIG. 3 illustrates an embodiment of an in-vehicle OTA television broadcast delivery system that performs dynamic content insertion and transmits feedback via a cellular interface.

FIG. 3 illustrates an embodiment of an in-vehicle OTA television broadcast delivery system 300 ("system 300") that performs dynamic content insertion and transmits feedback via a cellular interface. System 300 may function similarly to system 200 of FIG. 2 and system 100 of FIG. 1. However, in addition to the previously-detailed functionality of system 100 and system 200, HODM 120 can include cellular interface 310. Cellular interface 310 can allow HODM 120 to communicate with one or more cellular networks, such as a cellular network of which base station 330 is a part. By the cellular network being connected with network 320, which may include the Internet, data may be passed to television service provider server system 140.

The communication path between HODM 120 and television service provider server system 140 may be used to send feedback data. The feedback data may be indicative of pieces of content that are stored to content database 128 and are dynamically inserted in OTA television channel broadcasts that are output via wireless network interface 126 to one or more mobile devices 130. Information about particular pieces of content that are dynamically inserted into an OTA television channel broadcast may be used by television service provider server system 140, such as for billing purposes or determining how large of an audience that a particular piece of content is reaching. The feedback data may include: 1) a number of times a piece of content has been inserted; 2) the dates/times at which the piece of content was inserted; 3) the types/makes/models of devices the piece of content was output to; and/or 4) the geographic locations at which vehicle 101 was located when the piece of content was output.

Cellular interface 310 may also be used for purposes besides feedback. For instance, content to be stored to content database 128 for later insertion within an OTA television channel broadcast may be transmitted by television service provider server system 140 via cellular interface 310 and stored to content database 128. Additionally or alternatively, instructions on content to be recorded or deleted from content database 128 may be transmitted via cellular interface 310. Cellular interface 310 may also be used for Internet access by mobile devices 130 via wireless network interface 126. Additionally or alternatively, data stored to device profiles 210 may be provided to television service provider server system 140.

In some embodiments, rather than cellular interface 310 being incorporated as part of HODM 120, a local wired or wireless communication arrangement may be used to communicate with a user's mobile device, such as a cellular phone. The user's mobile device may then transmit the feedback data via a cellular network or some other form of wireless network.

Regardless of which arrangement is used as a cellular interface. The cellular interface may additionally be used for receiving Emergency Alert System (EAS) data in case the primary broadcast channel failed to transmit EAS data.

Figure 4:
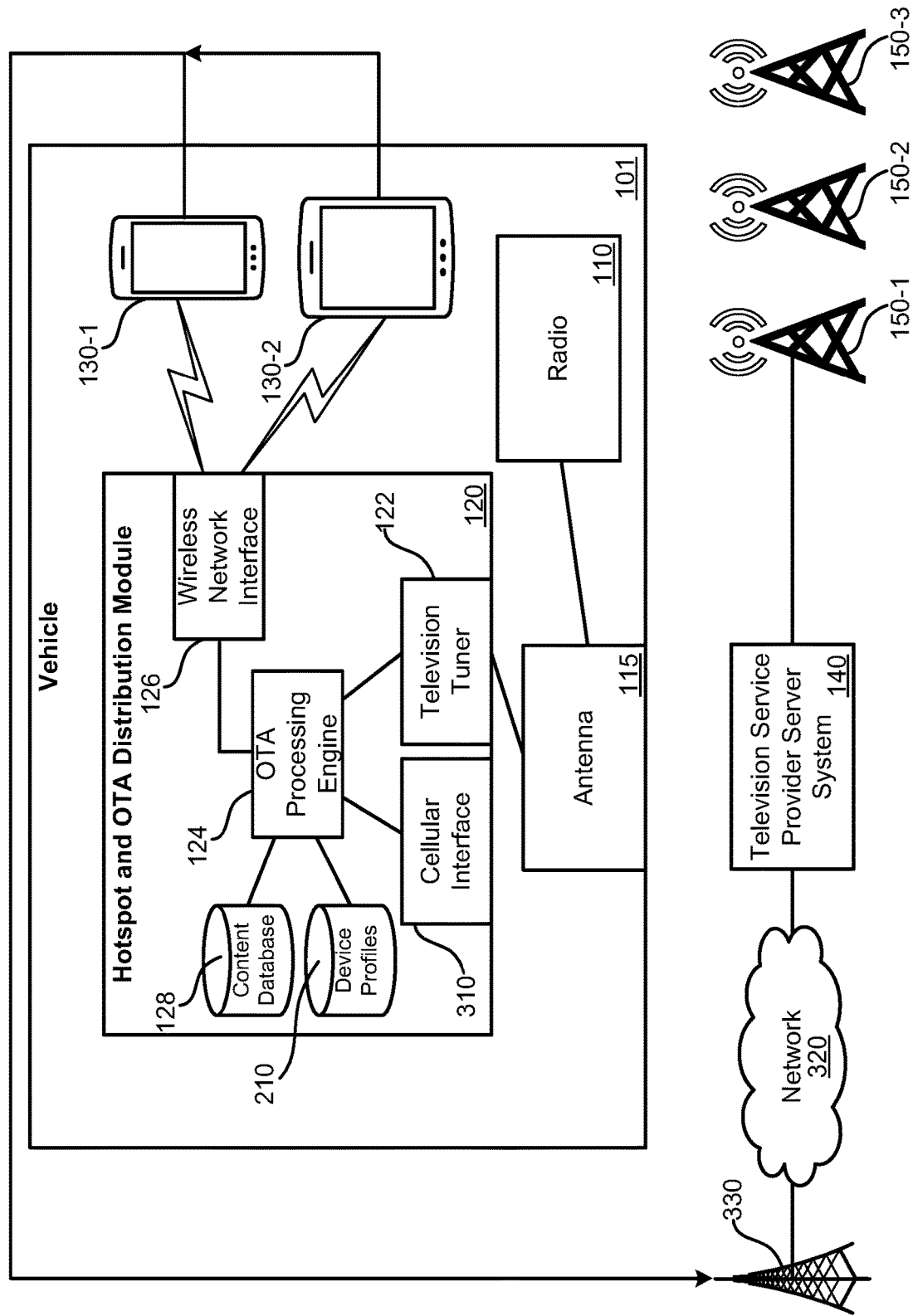
FIG. 4 illustrates an embodiment of an in-vehicle OTA television broadcast delivery system that performs dynamic content insertion and transmits feedback via a mobile device.

FIG. 4 illustrates an embodiment of an in-vehicle OTA television broadcast delivery system 400 ("system 400") that performs dynamic content insertion and transmits feedback via a mobile device. System 300 may function similarly to system 200 of FIG. 2 and system 100 of FIG. 1. However, in addition to the previously-detailed functionality of system 100 and system 200, system 400 may involve one or more mobile devices 130 communicating directly via cellular network with television service provider server system 140. It is also possible that system 400 and system 300 are combined such that both HODM 120 and mobile devices 130 are capable of communicating with television service provider server system 140 via one or more cellular networks.

In system 400, mobile devices 130 may execute an installed application that allows for viewing and listening to OTA television channel broadcasts via HODM 120. This application may be permitted to use cellular communications to transmit feedback data to television service provider server system 140. Similar feedback data as described in relation the system 300 may be transmitted directly by mobile devices 130 in system 400. If a particular mobile device of mobile devices 130 does not have cellular capabilities, that particular mobile device may not transmit feedback data to television service provider server system 140. Rather, cellular interface 310 may be used to transmit feedback for that particular mobile device or no feedback may be provided to television service provider server system 140 for that particular mobile device. In still other embodiments, the feedback data may be forwarded by HODM 120 to a mobile device that does have a cellular connection for transmission to television service provider server system 140.

While system 400 illustrates smartphone 130-1 and tablet computer 130-2 using base station 330 of the same cellular network to communicate with television service provider server system 140, it should be understood that different base stations in different cellular networks may be used to communicate with television service provider server system 140.

Figure 5:
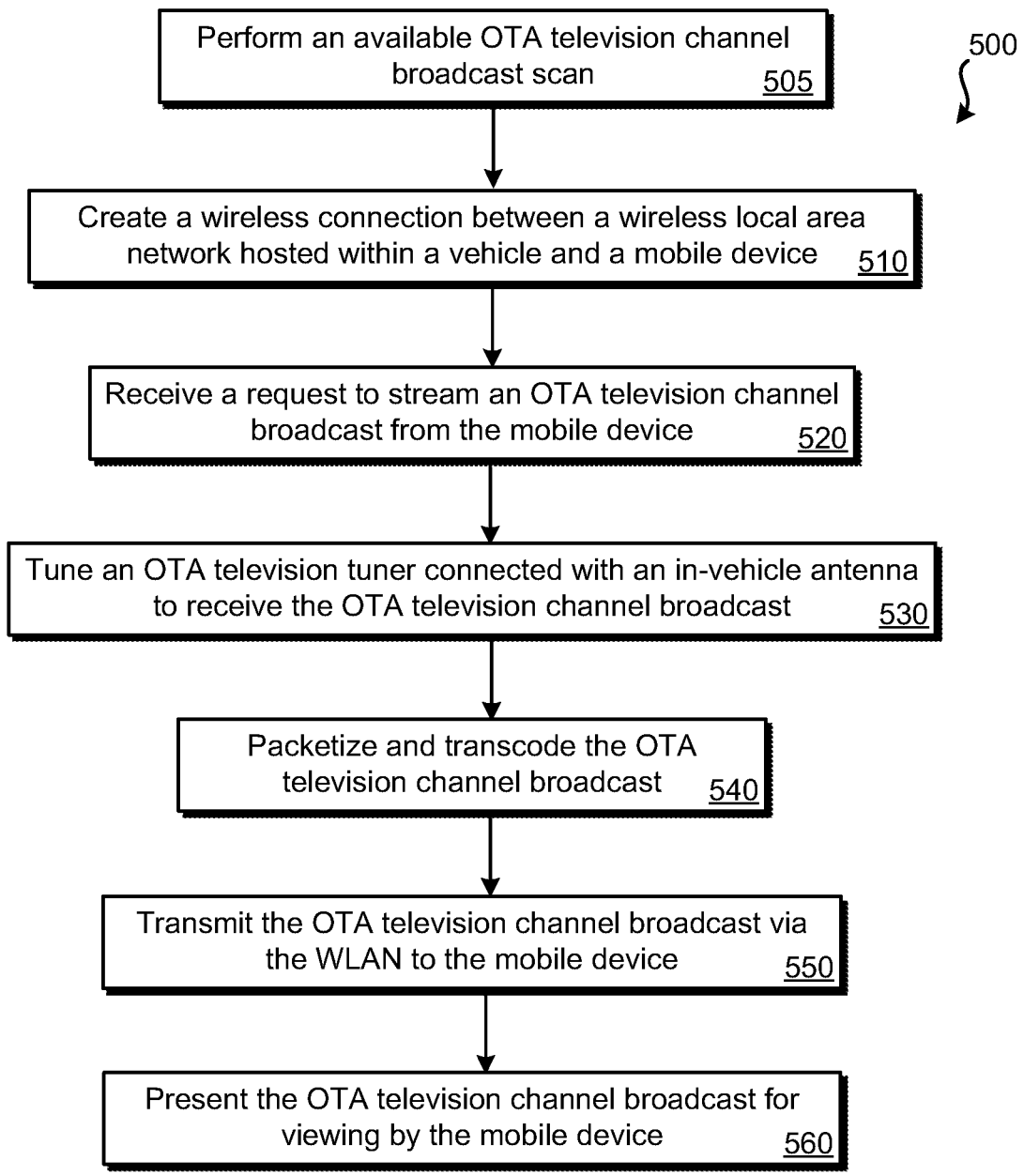
FIG. 5 illustrates an embodiment of a method for in-vehicle OTA television channel broadcast delivery.

Various methods may be performed using the systems detailed in relation to FIGS. 1-4. FIG. 5 illustrates an embodiment of a method for in-vehicle OTA television channel broadcast delivery. Method 500 may be performed using any of systems 100 through 400 detailed in relation to FIGS. 1-4, respectively.

At block 505, periodically, occasionally, or in response to a command a scan may be performed for available OTA television channel broadcasts. As a vehicle moves, it can be expected that OTA television channel broadcasts will come within range and go out of range, therefore it may be beneficial to periodically update which OTA television channel broadcasts can be received with a high enough signal strength to be successfully decoded. In some embodiments, the scan may be performed in response to a mobile device connecting with a WLAN of the vehicle or a message being received that requests an updated list of available OTA television channels. An application may be executed on a mobile device that lists the currently-available OTA television channel broadcasts and may indicate a signal strength.

At block 510, a connection may be formed between a WLAN that is hosted within a vehicle and a mobile device that is located within the vehicle or nearby the vehicle. If the vehicle is moving, the mobile device will likely be located within the vehicle. However, if the vehicle is stopped, mobile devices that are a short distance from the vehicle may be able to connect for a substantial amount of time with the WLAN. Valid credentials may be necessary for the mobile device to be able to successfully connect with the WLAN for security reasons.

At block 520, the mobile device may transmit a request to stream an OTA television channel broadcast to an HODM of the vehicle or some other component or module that locally manages OTA television channel reception. For instance, the request may be transmitted to an OTA processing engine. In response to the request, at block 530, an OTA television tuner, that is connected with an in-vehicle antenna, may be tuned to the requested OTA television channel broadcast. At block 540, the received OTA television channel broadcast may be transcoded into a format appropriate for transmission across a packet-based network and may be packetized.

At block 550, the packetized and possibly transcoded OTA television channel broadcast may be streamed via the WLAN to the mobile device. At block 560, the OTA television channel broadcast may be output for presentation via the mobile device. Therefore, the mobile device outputs a live stream of the OTA television channel broadcast as received via the WLAN. This can include the mobile device directly outputting video and/or audio of the OTA television channel broadcast. In some embodiments, one or more peripherals may be connected with the mobile device to output the video and/or audio, such as headphones. In other situations, the OTA television channel broadcast may have been previously recorded and may be streamed locally from the storage medium to the mobile device via the WLAN.

Figure 6:
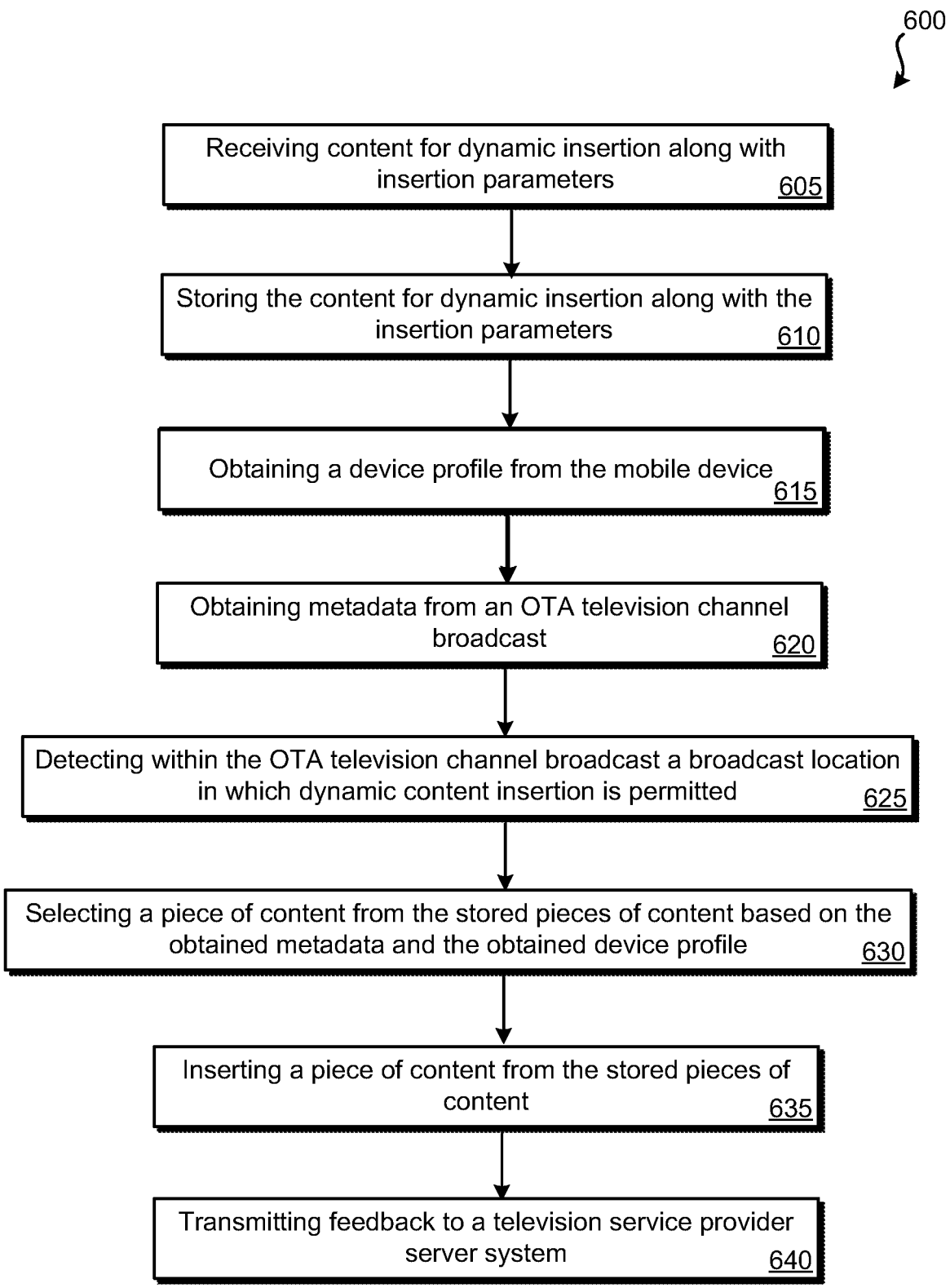
FIG. 6 illustrates an embodiment of a method for dynamic content insertion within an OTA television channel broadcast.

FIG. 6 illustrates an embodiment of a method 600 for dynamic content insertion within an OTA television channel broadcast. Method 600 may be performed together with method 500 of FIG. 5. That is, blocks of method 600 may be performed before and after various blocks of method 500.

At block 605, one or more pieces of content may be received that are to be used for dynamic insertion within one or more OTA television channel broadcasts. The one or more pieces of content may be received via: an OTA television channel broadcast that is dedicated to providing content to be used for dynamic insertion; an OTA television channel broadcast; a cellular network connection; and/or a WLAN connection. These pieces of content may be received before a user requests output of a particular OTA television channel broadcast. The one or more pieces of content may be stored at block 610 using one or more non-transitory processor readable mediums. Along with each piece of content, insertion parameters may be received at block 605 and stored at block 610. Insertion parameters may define the particular configuration that must be present in order for the stored piece of content to be eligible for insertion in an OTA television channel broadcast. For instance, the insertion parameters may include: a duration of the piece of content; one or more eligible OTA television channels; an eligible geographic area; eligible time periods; eligible dates; and/or a defined number of maximum times the piece of content is permitted to be inserted. The insertion parameters may also define particular user or device characteristics that are desired to be targeted by the piece of content. For instance, the insertion parameters may also define: types/makes/models of mobile devices that the piece of content are eligible to be output on; an age range of a desired viewer; and/or desired biographical details of a desired viewer (e.g., sex, favorite viewing changes, favorite content genres, etc.).

At block 615, a device profile may be obtained for each mobile device that is connected with the WLAN generated by the in-vehicle system. The device profile may be generated based on characteristics obtained from the mobile device, such as MAC address, type/make/model of mobile device, and/or SIM card identifier. As the mobile device communicates with the WLAN, additional data may be added to the device profile based on the OTA television channel broadcasts viewed using the device and/or activities performed on the Internet via the WLAN. In some embodiments, an application may be executed by the mobile device that can locally collect data from the mobile device and provide the data to the in-vehicle system for use in updating the device profile. This application may be the same application that allows a user to select and view an OTA television channel broadcast.

Block 620 may be performed after block 530. At block 620, metadata may be obtained from an OTA television channel broadcast. The metadata included in the OTA television channel broadcast that is being output to the mobile device for presentation may be indicative of a piece of content that is permissible to replace with an instance of dynamic content that is locally stored. For instance, the metadata may indicate a duration of the piece of content that is permissible to replace and parameters for the type of piece of content that can be dynamically inserted instead. For example, the piece of content that can be dynamically inserted instead may be required to have been received on the same OTA television channel or have a certain rating to be appropriate for a type of audience (e.g., children, teens).

At block 625, based on metadata received as part of an OTA television channel broadcast that is being output to a mobile device for presentation, a broadcast location may be identified at which dynamic content insertion is permitted. Just because dynamic content insertion is permitted, does not mean it is required. If dynamic content that[??] is not inserted in the OTA television channel broadcast is continued to be output, the viewer may still receive a continuous stream of content and a piece of content that is present within the OTA television channel broadcast at the location at which dynamic insertion is permitted may be presented. At block 630, if dynamic insertion is to be performed, a piece of content from a locally stored content database on the vehicle may be selected. Selection at block 630 may be performed by an OTA processing system based on: the insertion parameters associated with the stored pieces of content from block 605; the metadata associated with the location at which the dynamic insertion is permitted within the OTA television channel broadcast; the device profile of the mobile device to which the OTA television channel broadcast is being output; the geographic location of the vehicle; and/or the day of the week/date/time.

While the above description is focused on dynamic insertion being performed on a live OTA television channel broadcast, similar steps may be performed on a previously-recorded OTA television channel broadcast that has been stored. That is, during playback, the metadata of the stored OTA television channel broadcast may be used to determine which pieces of content within the broadcast dynamic insertion of other pieces of content are permitted to be performed.

At block 635, the piece of content selected at block 630 may be dynamically inserted into the OTA television channel broadcast that is being streamed via the WLAN to the mobile device. From the point of view of the mobile device, the OTA television channel broadcast appears continuous. It is possible that if two mobile devices are streaming the same OTA television channel broadcast, a different piece of content may be dynamically inserted in the stream provided to each mobile device. At block 640, feedback data may be transmitted to the television service provider service system to indicate the piece of content that was dynamically inserted and other characteristics of the insertion (e.g., time, date, number of times the insertion was performed, geographic location of the vehicle at the time of insertion). The feedback of block 640 may be transmitted directly by the mobile device using a cellular network, may be provided to the in-vehicle system which may then transmit the feedback data using a cellular interface, or may be transmitted the next time the mobile device or the in-vehicle system connects with an Internet-connected wireless network.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for in-vehicle delivery of over-the-air (OTA) television channel broadcasts, the system comprising:
   a vehicle antenna that is installed on a vehicle;
   an OTA television tuner that receives an OTA television channel broadcast and is electrically connected with the vehicle antenna;
   a content storage non-transitory processor-readable medium that stores a plurality of pieces of content received by an OTA television-enabled wireless network hotspot module; and
   the OTA television-enabled wireless network hotspot module that is installed in the vehicle and receives the OTA television channel broadcast from the OTA television tuner, wherein the OTA television-enabled wireless network hotspot module is configured to:
      receive, via a Wi-Fi Internet connection when the vehicle is parked at home, the plurality of pieces of content;

create a mobile device profile for a mobile device in
    response to the mobile device wirelessly connecting
    to the OTA television-enabled network hotspot module, wherein:
    the mobile device profile indicates a type of the
       mobile device; and
    usage statistics indicative of OTA television channel
       broadcasts viewed on the mobile device are stored
       in the mobile device profile;
select a piece of content from the plurality of pieces of
    content received via the Internet based on the mobile
    device profile;
detect a designated location within the OTA television
    channel broadcast and insert the selected piece of
    stored content such that the inserted piece of stored
    content is transmitted as part of the packetized OTA
    television channel broadcast via a local wireless area
    network (WLAN) to the mobile device located
    within the vehicle;
packetize the OTA television channel broadcast; and
transmit the packetized OTA television channel broadcast via the WLAN to the mobile device located
    within the vehicle.

2. The system for in-vehicle delivery of OTA television broadcasts of claim 1, wherein the OTA television-enabled wireless network hotspot module is configured to analyze metadata received as part of the OTA television channel broadcast and the piece of stored content is selected from the plurality of pieces of stored content based at least in part on the metadata.

3. The system for in-vehicle delivery of OTA television broadcasts of claim 2, the system further comprising:
    a cellular interface that communicates with the OTA television-enabled wireless network hotspot module and that transmits data received from the OTA television-enabled wireless network hotspot module to a remote server system.

4. The system for in-vehicle delivery of OTA television broadcasts of claim 3, wherein the transmitted data comprises usage feedback about the plurality of pieces of stored content being inserted into OTA television channel broadcasts.

5. The system for in-vehicle delivery of OTA television broadcasts of claim 2, the system further comprising a smartphone, wherein the smartphone functions as the mobile device and the smartphone transmits usage feedback about the plurality of pieces of stored content being inserted into OTA television channel broadcasts via a cellular network with which the smartphone directly communicates.

6. The system for in-vehicle delivery of OTA television broadcasts of claim 1, wherein the vehicle antenna additionally functions as a frequency modulation (FM) radio antenna for radio stations broadcast using the VHF (Very High Frequency) frequency band.

7. A method for in-vehicle delivery of over-the-air (OTA) television channel broadcasts, the method comprising:
    receiving, by an OTA television-enabled wireless network hotspot module, a plurality of pieces of content to be inserted during OTA television channel broadcasts via a Wi-Fi based Internet connection when a vehicle is parked at home;
    connecting, by the OTA television-enabled wireless network hotspot module, a mobile device located within the vehicle with a wireless local area network (WLAN) created by the OTA television-enabled wireless network hotspot module, wherein the OTA television-enabled wireless network hotspot module is installed within the vehicle;
    creating a mobile device profile for the mobile device in response to the mobile device wirelessly connecting to the OTA television-enabled network hotspot module, wherein:
       the mobile device profile indicates a model of the mobile device; and
       usage statistics indicative of OTA television channel broadcasts viewed on the mobile device are stored in the mobile device profile;
    receiving, by the OTA television-enabled wireless network hotspot module from the mobile device, a request to stream an OTA television channel broadcast;
    receiving, by the OTA television-enabled wireless network hotspot module, via an OTA television tuner and an in-vehicle antenna, the OTA television channel broadcast;
    selecting a piece of content from the plurality of pieces of content received via the Internet based on the mobile device profile;
    detecting a designated location within the OTA television channel broadcast and insert the selected piece of stored content such that the selected piece of content is transmitted as part of the packetized OTA television channel broadcast via the WLAN to the mobile device located within the vehicle;
    packetizing, by the OTA television-enabled wireless network hotspot module, the OTA television channel broadcast to a format appropriate to transmit via the wireless local area network to the mobile device; and
    transmitting, by the OTA television-enabled wireless network hotspot module, the packetized OTA television channel broadcast via the WLAN to the mobile device located within the vehicle.

8. The method for in-vehicle delivery of OTA television broadcasts of claim 7, the method further comprising:
    analyzing metadata received as part of the OTA television channel broadcast, wherein the piece of stored content is selected from the plurality of pieces of content based at least in part on the metadata.

9. The method for in-vehicle delivery of OTA television broadcasts of claim 8, the method further comprising:
    transmitting, by the OTA television-enabled wireless network hotspot module, via a cellular interface, feedback data to a remote server system.

10. The method for in-vehicle delivery of OTA television broadcasts of claim 9, wherein the transmitted feedback data comprises usage feedback about the plurality of pieces of content being inserted into OTA television channel broadcasts.

11. The method for in-vehicle delivery of OTA television broadcasts of claim 7, wherein the vehicle antenna additionally functions as a frequency modulation (FM) radio antenna for radio stations broadcast using the VHF (Very High Frequency) frequency band.

12. The method for in-vehicle delivery of over-the-air (OTA) television channel broadcasts of claim 7, the method further comprising:
    presenting, by the mobile device, video of the packetized OTA television channel broadcast for viewing by a user.

* * * * *